United States Patent Office 3,376,110
Patented Apr. 2, 1968

3,376,110
SOLID STABILIZED HYDROGEN PEROXIDE COMPOSITIONS
Dimitry Alexis Shiraeff, Kutztown, Pa., assignor to General Aniline & Film Corporation, New York, N.Y., a corporation of Delaware
No Drawing. Filed Jan. 30, 1967, Ser. No. 612,349
9 Claims. (Cl. 23—207.5)

ABSTRACT OF THE DISCLOSURE

A solid stabilized hydrogen peroxide composition comprising hydrogen peroxide and a stabilizing amount of a water-insoluble polymeric N-vinyl heterocyclic compound which may be prepared by drying an aqueous slurry of said components.

---

This invention is directed to solid stabilized hydrogen peroxide compositions containing a stabilizing amount of a water-insoluble polymeric N-vinyl heterocyclic compound, as well as to the method of producing stabilized compositions.

It is well known that hydrogen peroxide, even when present in an aqueous composition, is adversely effected by the presence of oxidizable impurities and catalytic agents and is, therefore, susceptible to deterioration or related degradation upon standing and storage. This is a serious disadvantage to industry, since such concentrates often must be stored for extended periods of time up to weeks or months. A number of stabilizers and deterioration inhibitors have been proposed for the purpose of preventing such deterioration. However, these known stabilizers or inhibitors vary in their effectiveness and by and large exhibit one or more disadvantages such as being expensive, failing to prevent effervescence, imparting undesirable color, or lacking sufficient solubility. Stabilized aqueous hydrogen peroxide solutions also have the disadvantage of losing their stability upon storage and decompose at high temperatures. Moreover, the risk of explosion and the hazards of spillage that are attendant to the transportation further add to the disadvantage of such stabilized aqueous solutions.

It is an object of this invention to provide a stabilized hydrogen peroxide composition which is not subject to the above mentioned disadvantages. Another object of this invention is to provide a stabilized solid hydrogen peroxide composition containing a stabilizing amount of a water-insoluble polymeric N-vinyl heterocyclic compound, thereby extending the useful life span of hydrogen peroxide by providing stabilized solid compositions that may be safely shipped and stored at room or higher temperatures, and used as required. A further object of this invention is to provide methods for the manufacture of said stabilized compositions. Other objects and advantages of this invention will become apparent as this description proceeds.

The attainment of the above objects is made possible by the instant invention which is directed to novel and unobvious stabilized solid compositions comprising hydrogen peroxide and a stabilizing amount of a polymeric N-vinyl heterocyclic compound. I have made the surprising discovery that the instant stabilized solid compositions may be formed by drying, e.g., evaporating an aqueous slurry of $H_2O_2$ containing a stabilizing amount of a water-insoluble polymeric N-vinyl heterocyclic compound to apparent dryness until a solid granular free-flowing powder has been obtained. It is believed that complexes of polymeric N-vinyl heterocyclic compounds and hydrogen peroxide are formed upon drying the aqueous compositions of same, but I prefer not to be limited to any particular theory as to the manner or mode in which this invention may operate. While these complexes are solid granular dry products, they are not necessarily anhydrous due to the hydrophilic nature of the polymeric N-vinyl heterocyclic compounds and amounts of moisture which do not affect the solid dry characteristics of the complexes can be tolerated.

Water-insoluble polymeric N-vinyl heterocyclic compounds which I have found useful in the practice of the present invention are illustrated by the following compounds: (a) crosslinked water-insoluble poly-N-vinyl polylactams of the type produced by polymerizing a vinyl lactam, i.e., an organic ring compound containing in its ring an acyl group attached to a nitrogen atom, in the presence of an alkaline catalyst as described, for example, in U.S. Patents 2,938,017 and 3,277,066 and U.S. application, Ser. No. 318,195, filed Oct. 25, 1963 by Grosser, Hort and Schwartz, now U.S. Patent 3,306,886, such as the polymers of N-vinyl polypyrrolidone, preferably poly-N-vinyl poly-2-pyrrolidone, poly-N-vinylpoly-2-piperidone poly-N-vinylpoly-2-piperidone and poly-N-vinyl-poly-2-caprolactam; (b) water-insoluble poly-N-vinyl polyimides produced as described in U.S. patent application Ser. No. 285,870, filed June 6, 1963, now U.S. Patent 3,306,881; and (c) water-insoluble copolymers of the before mentioned N-vinyl heterocyclic compounds containing a high percentage of water-insoluble vinyl monomer produced from polymerizing N-vinyl heterocyclic and dissimilar vinyl monomers such as described in U.S. Patent 2,667,473 and U.S. Patent 2,947,633, for example.

Homopolymers, random type copolymers and graft copolymers of the above described types having molecular weights from about 1,000 to 500,000 are preferred in the practice of this invention. Generally, I prefer to use polyvinylpolypyrrolidone having molecular weights of from about 300,000 to 400,000. For some applications it may be advantageous to use mixtures of the above described polymeric materials having different molecular weight ranges.

When copolymers are used, the weight ratio of the component N-vinyl heterocyclic monomer to that of the dissimilar vinyl monomer in the copolymer will determine its properties. Choice of the weight ratio will depend on the particular properties desired in the copolymer. Preferred weight ratios of N-vinyl heterocyclic monomer to dissimilar vinyl monomers include ratios from 40:60 upward.

The amount of hydrogen peroxide present in the aqueous hydrogen peroxide slurries that are to be dried in order to obtain the instant solid compositions, has not been found to be critical, since weak slurries of hydrogen peroxide, as well as strong slurries of hydrogen peroxide have been effectively utilized. A proportion of hydrogen peroxide is retained in the instant stabilized compositions, i.e., free flowing powder obtained upon drying the aqueous hydrogen peroxide slurries containing a water-insoluble polymeric N-vinyl heterocyclic compound. This proportion of retained hydrogen peroxide appears to vary with the concentration of hydrogen peroxide in relation to the heterocyclic compound and with the total volume of the slurry. It is preferred that sufficient hydrogen peroxide be present before drying, so as to obtain a solid composition containing at least about 2% and preferably about 4.5 to 70% by weight $H_2O_2$ based on the weight of the polymer compound present in the final product.

The amount of water-insoluble polymeric N-vinyl heterocyclic preservatives added to the aqueous hydrogen peroxide solutions is also not critical, the only requirement being that sufficient amounts be added so that the hydrogen peroxide in the solid composition is stabilized. It is obvious that the amount added will vary with the heterocyclic compound, the amount of hydrogen peroxide in the aqueous solution, as well as the particular use desired of the stabilized composition. However, it is preferred to use at least 1 part by weight of heterocyclic compound per 10 parts by weight of hydrogen peroxide.

The instant solid compositions are not only stable under room temperature storage, but even when heated at 100° C. for 6 hours in an electric oven, have been found to still retain a substantial amount of hydrogen peroxide. The retention of hydrogen peroxide in the solid granular compositions would seem to indicate there is a formation of some loose compound between the heterocyclic compound and hydrogen peroxide, depending perhaps on the interplay of the residual valence forces. However, this is merely an explanation by way of theory and it is understood that applicant does not intend to be limited by the manner or mode in which this invention may operate.

The manner in which the aqueous hydrogen peroxide compositions are formed is not critical, since the components may be added in any manner. For instance, the solid polymeric N-vinyl heterocyclic compound may be mixed with 100% $H_2O_2$ or added to an aqueous solution of the hydrogen peroxide or alternatively 100% hydrogen peroxide may be added to an aqueous slurry of the heterocyclic compound or an aqueous slurry of the heterocyclic compound and an aqueous solution of hydrogen peroxide may be mixed together. As stated above, the preparation of the instant stable, solid hydrogen peroxide polymeric N-vinyl heterocyclic compositions may be carried out by drying the aqueous counterpart compositions. While the presence of water is technically not essential in the formation of the instant solid compositions, due to the danger and hazards of fire and explosion accompanied with the handling of pure hydrogen peroxide, the use of intermediate aqueous solutions or slurries is definitely preferred. The method of drying is immaterial, and essentially any means of vaporizing or evaporating the water may be employed, the only requirement being that care must be taken to see that the desired dry compositions are not destroyed. Thus, heating in trays in a drying oven, evaporation on a steam bath, and drum drying either at atmospheric pressure or under vacuum have been found to be effective. Suction filtration may be used if desired.

The instant stabilized, solid compositions have a wide range of utility in both the commercial and industrial fields. For example, they may form the basis of washing concentrates, bleaching agents, disinfecting agents, sterilization agents, etching agents and cosmetic agents. Moreover, they may be utilized in various bleaching operations, such as the bleaching of wool and human hair or they may be used as clarification and sterilization agents for beverages such as beer, whisky, wine and other alcoholic and fermented beverages. In addition, such compositions may be used to provide a source of oxygen which can be released at a controlled rate for sterilization and may be applied directly to wounds or from the basis of a permanently antiseptic material. Moreover, the instant stabilized compositions may be used as catalysts, in situ, polymerizations requiring a free radical source. It is, therefore, apparent that the present stabilized compositions may be formulated with the usual additives, for example pH modifiers, detergents, sunscreen agents, emollients, brighteners, and the like, depending on the particular use contemplated.

The following examples are illustrative of the present invention and are not to be regarded as limitative. It is to be understood that all parts, percentages and proportions referred to herein and in the appended claims are by weight unless otherwise indicated.

Example I

Seven different solid granular stabilized hydrogen peroxide-water-insoluble polyvinylpolypyrrolidone compositions were prepared by carrying out the following four experiments:

In Experiment 1 (Samples 1 and 2) 10 ml. of a hydrogen peroxide solution (50% hydrogen peroxide) were added to two different amounts of a water-insoluble polyvinylpolypyrrolidone, prepared according to Example I in U.S. application, Ser. No. 318,195, filed Oct. 25, 1963, contained in an evaporating dish. The dish was placed on a water bath and the contents evaporated to an apparent dryness of the residue. The contents of the dish were transferred to a beaker, filtered through a Gooch crucible and washed. The crucibles with the residues were then dried to constant weight in an oven at 50° C.

In Experiment 2 (Samples 3 and 4) the same procedure as in Experiment 1 was employed except that 50 ml. of an aqueous hydrogen peroxide solution (50% hydrogen peroxide) and larger quantities of polyvinylpolypyrrolidone were used.

In Experiment 3 (Sample 5) a 100 ml. aqueous hydrogen peroxide solution (30% hydrogen peroxide) was added to the polyvinylpolypyrrolidone contained in a beaker. The mixture was stirred by a magnetic stirrer for 2 hours. The contents of the beaker were then filtered through a Buchner funnel and suction was maintained overnight to dry the residue.

In Experiment 4 (Sample 6) a 50 ml. aqueous hydrogen peroxide solution (50% hydrogen peroxide) was added to the polyvinylpolypyrrolidone in an evaporating dish and the contents evaporated on a water bath until a free flowing powder was obtained. Sample 7 was prepared in the same manner except that a 100 ml. aqueous hydrogen peroxide solution (50% hydrogen peroxide) was used.

The amount of hydrogen peroxide contained in the above prepared solid granular compositions was evaluated by titrating to determine the hydrogen peroxide content. The quantities used and the results of analysis of the product are summarized in the following table:

TABLE I

| Sample No. | 1 | 2 | 3 | 4 | 5 | 6 | 7 |
|---|---|---|---|---|---|---|---|
| Weight of polyvinyl polypyrrolidone used (grams) | .2486 | .2606 | 5.021 | 5.017 | 10.0 | 10.0 | 10.0 |
| $H_2O_2$ in product (percent/wgt.) based on product weight | 33.02 | 52.82 | 64.22 | 68.27 | 26.76 | 51.20 | 61.72 |

Example II

In order to demonstrate the stability of the instant solid granular stabilized hydrogen peroxide water-insoluble polyvinylpolypyrrolidone compositions to storage at room temperature, a portion of Sample 6 of Example I and a portion of Sample 7 of Example I were each placed in sample bottles, covered with punctured aluminum foil and left standing in the laboratory at room temperature. Similar portions of these samples were also placed in like containers and stored in a refrigerator. The following table demonstrates the excellent stability of the instant compositions by summarizing the results of hydrogen peroxide remaining in the samples at intervals during a 37 day storage period.

TABLE II.—PERCENT/WGT. $H_2O_2$ BASED ON PRODUCT WEIGHT

| Sample | Initial | 7 days | 15 days | 37 days |
|---|---|---|---|---|
| 6 at room temperature | 51±1 | 52±1 | 47±1 | 46±1 |
| 6 upon refrigeration | 51±1 | 51±1 | 51±1 | 52±1 |
| 7 at room temperature | 62±1 | 62±1 | 55±1 | 54±1 |
| 7 upon refrigeration | 62±1 | 61±1 | 62±1 | 62±1 |

Example III

In order to demonstrate the stability of the instant stabilized solid granular compositions at high temperatures, 7 portions of Sample 7 of Example I were placed in small weighing dishes without a cover and weighed. The mouth of each dish (except No. 1 used as a control) was wrapped with aluminum foil and aluminum foil punctured in the center. The other six dishes were placed in an oven at 100° C. After 1 hour dish No. 2 was removed, the aluminum foil taken off, and the dish plunged into a 2 liter volumetric flask. The foil was rinsed into the same flask and the volume of the flask brought to the mark with water. An aliquot was taken out and titrated for hydrogen peroxide with 0.1 N thiosulphate to determine the amount of hydrogen peroxide retained by the solid composition. The same procedure was performed with dish No. 3 after it had remained in the oven for 2 hours and the same procedure on the other dishes followed in 3 then 4 then 5 and finally after a six hour stay in the oven. The results of the analysis are given in the following table:

TABLE III

| Dish No. | 1 | 2 | 3 | 4 | 5 | 6 | 7 |
|---|---|---|---|---|---|---|---|
| Kept in oven at 100° C. (hrs.) | None | 1 | 2 | 3 | 4 | 5 | 6 |
| $H_2O_2$ found based on product weight, percent | 62.20 | 53.47 | 48.09 | 37.18 | 22.90 | 15.44 | 14.19 |
| $H_2O_2$ percent of original | 100 | 85.96 | 77.32 | 59.77 | 36.82 | 24.82 | 22.81 |
| $H_2O_2$ percent loss | | 14.04 | 22.68 | 40.23 | 63.23 | 75.18 | 77.19 |

Example IV

A slurry of 200 g. of polyvinylpolypyrrolidone prepared as in Example I, a 250 ml. aqueous solution of hydrogen peroxide (50% $H_2O_2$) and 1260 ml. of water were placed in a large petri dish on a hot water bath. The sample was heated with occasional stirring until evaporation of the water and excess hydrogen peroxide was complete. Upon drying, a fine, damp powder of polyvinylpolypyrrolidone/$H_2O_2$ was recovered and found to contain 16.9% hydrogen peroxide. After over 5 months of storage, the powder was still found to contain approximately 14.0% hydrogen peroxide, demonstrating the effectiveness of polyvinylpolypyrrolidone as the stabilizing agent.

Other water-insoluble polymeric N-vinyl heterocyclic compounds may be used in the above examples instead of polyvinylpolypyrrolidone. Such compounds include water-insoluble polymers such as poly-N-vinyl polyimidazole, poly-N-vinyl polypiperidone, poly-N-vinylpolycaprolactam, water-insoluble copolymers of N-vinyl-2-pyrrolidone and vinyl acetate, water-insoluble copolymers of N-vinyl-2-pyrrolidone and styrene, water-insoluble copolymers of N-vinyl-2-pyrrolidone and vinyl chloride, water-insoluble copolymers of N-vinyl-2-pyrrolidone and methyl vinyl ether, or the like. It is to be understood that monomers of other N-vinyl lactams, N-vinyl imides, or the like may be used in the preparation of the above water-insoluble copolymers.

Example V

Another series of solid stabilized hydrogen peroxide-polyvinylpolypyrrolidone compositions were prepared by the following procedure:

A slurry of polyvinylpolypyrrolidone in hydrogen peroxide solution was prepared by adding 25 g. of polyvinylpolypyrrolidone prepared as in Example I, to 200 ml. of hydrogen peroxide solution. The concentration of the hydrogen peroxide solution was varied over a range of from 1¼% $H_2O_2$ to 50% $H_2O_2$. The slurry preparation was stirred with a magnetic stirrer for one hour at room temperature and then filtered through an 8 cm. Buchner funnel lined with two sheets of 41H filter paper. The filtering process was very rapid and was discontinued when no more liquid could be extracted. The polyvinylpolypyrrolidone/$H_2O_2$ sample was removed from the Buchner funnel and placed in a pan on the steam bath for 30 minutes to dry. The results are shown in the following table:

TABLE IV

| Percent $H_2O_2$ Solution | No. of ml. of 50% $H_2O_2$ | No. of ml. of water | Grams of polyvinyl polypyrrolidone | Percent $H_2O_2$ in polyvinylpolypyrrolidone/$H_2O_2$ |
|---|---|---|---|---|
| 1¼ | 5 | 195 | 25 | 2.77 |
| 2½ | 10 | 190 | 25 | 5.13 |
| 5 | 20 | 180 | 25 | 12.60 |
| 10 | 40 | 160 | 25 | 18.30 |
| 15 | 60 | 140 | 25 | 23 10. |
| 20 | 80 | 120 | 25 | 28.20 |
| 25 | 100 | 100 | 25 | 29.90 |
| 30 | 120 | 80 | 25 | 33.70 |
| 35 | 140 | 60 | 25 | 36.35 |
| 40 | 160 | 40 | 25 | 40.30 |
| 50 | 200 | 0 | 25 | 41.60 |

Various modifications and variations of this invention will be obvious to a worker skilled in the art and it is understood that such modifications and variations are to be included within the purview of this application and the spirit and scope of the appended claims.

I claim:

1. A solid stabilized composition comprising hydrogen peroxide and a stabilizing amount of a water-insoluble polymeric N-vinyl heterocyclic compound, wherein the amount of hydrogen peroxide present is at least about 2% by weight, based on the weight of polymer in the product.

2. A solid stabilized composition as defined in claim 1, wherein the water-insoluble polymeric N-vinyl heterocyclic compound is selected from the group consisting of water-insoluble poly-N-vinyl polylactams, water-insoluble poly-N-vinyl polyimides and water-insoluble copolymers of N-vinyl heterocyclic monomers with dissimilar vinyl monomers.

3. A solid stabilized composition as defined in claim 1, wherein the polymeric N-vinyl heterocyclic compound is water-insoluble polyvinylpolypyrrolidone.

4. A solid stabilized composition as defined in claim 1, wherein the polymeric N-vinyl heterocyclic compound is water-insoluble poly-N-vinyl-poly-2-pyrrolidone.

5. A process for preparing a solid stabilized composition as defined in claim 1, which comprises drying an aqueous composition of hydrogen peroxide and a water-insoluble polymeric N-vinyl heterocyclic compound.

6. A process as defined in claim 5, wherein the water-insoluble polymeric N-vinyl heterocyclic compound is selected from the group consisting of water-insoluble poly-N-vinyl polylactams, water-insoluble poly-N-vinyl polyimides, and water-insoluble copolymers of N-vinyl heterocyclic monomers with dissimilar vinyl monomers.

7. A process as defined in claim 5, wherein the polymeric N-vinyl heterocyclic compound is water-insoluble polyvinylpolypyrrolidone.

8. A process as defined in claim 5, wherein the polymeric N-vinyl heterocyclic compound is water-insoluble poly-N-vinyl-poly-2-pyrrolidone.

9. A solid stabilized composition as defined in claim 1, wherein the amount of hydrogen peroxide present is from about 4.5% to about 70% by weight.

References Cited

UNITED STATES PATENTS 1,045,451  11/1912  Stanek _____ 23—207.5
2,120,430  6/1938  Rieche _____ 23—207.5

OSCAR R. VERTIZ, *Primary Examiner.*

H. S. MILLER, *Assistant Examiner.*